3,095,298
DEFOLIATION OF COTTON PLANTS WITH AMMONIA
James B. Fisher, Westhaven, and George W. Cazaly, Hanford, Calif., assignors to California Research Corporation, San Francisco, Calif., a corporation of Delaware
No Drawing. Filed Mar. 23, 1961, Ser. No. 97,723
2 Claims. (Cl. 71—2.2)

It has become standard practice among cotton growers to defoliate cotton crops prior to harvesting. Defoliation is usually necessary on cotton which is to be machine picked, as the majority of machines now in use, if applied to undefoliated cotton plants, produce stained cotton and result in an inferior or unsalable harvest. Recently, cotton-picking machines have become available which separate the cotton from the leaves; however, these machines are extremely expensive and have not become commercially practical for the average cotton farmer.

Still another reason for defoliating cotton is to control cotton boll rot. The lower portions of the cotton plant, shaded from sun and protected from wind by these leaves, retain a great deal of moisture. This damp portion of the cotton plant serves as an excellent host to the fungus causing cotton boll rot, a common, harmful cotton disease. Defoliation leaves all portions of the plant open to sunlight and wind, thereby keeping even these lower portions of the plant relatively dry and unsusceptible to boll rot.

The various commercially available cotton defoliants, such as magnesium chlorate, sodium chlorate, pentachlorophenol, and cyanamides, suffer from many serious disadvantages and deficiencies. First of all, the best of them is generally only about 80 percent effective and often requires two applications to obtain this 80 percent effectiveness. Furthermore, the majority of these defoliants, due to their method of application, are the least effective on the lower portions of the plant—the very portion which most needs defoliation to prevent boll rot.

Still another drawback of certain conventional defoliants is that they leave a deleterious residue after harvest. Since it has become common practice of farmers to rotate crops so that no one crop is grown on the same acreage in two successive years, any residue which is harmful to the next year's crop growth must be eliminated. Reduced yields of certain grains, such as barley, have been reported in years immediately following the use of some commercial cotton defoliants.

Still other prior art defoliants require a minimum of dew on the leaves to be effective. In many areas of the country, however, the dew level is so low that these particular defoliants are of no value.

The most serious handicap of most prior art defoliants is that irrigation of the cotton crop must be ceased at least three to five weeks prior to defoliation in order for these compounds to be effective. The cotton plant must be relatively dry for prior art defoliants to be fully effective. This prolonged drying period is a particularly great handicap in areas where heavy rains are normal in the fall season. It is essential that the cotton be harvested prior to these fall rains. Where a three-to-five week drying prior to defoliation is required, a substantial portion of the most desirable growing season is not effectively utilized to obtain an increased harvest. During the drying period, cotton growth is essentially stopped, resulting in a commensurate reduction in the size of the cotton harvest.

Still further yield reduction has resulted from the use of prior art defoliants because these particular compounds tend to inhibit or entirely prevent the opening of previously unopened cotton bolls.

It has now been discovered that cotton plants may be easily and effectively defoliated by admixing with the air surrounding said cotton a sufficient amount of anhydrous ammonia vapor to surround said cotton with an ammonia vapor-air mixture containing from about 0.01 to 0.10, preferably 0.02 to 0.06, pound of anhydrous ammonia per cubic yard of air for a period of about one-half to five seconds. Effective defoliation of a normal stand of cotton can be accomplished with the use of about 100–500, preferably 250–350, pounds of anhydrous ammonia per acre. The amount of ammonia which can be effectively used varies within these limits with the particular variety of cotton to be defoliated, and also somewhat with the climatic conditions under which the cotton is grown. It has been found that with ammonia defoliation, irrigation need be ceased only from about one to two weeks prior to treatment rather than three to five weeks prior, as required by conventional defoliants now used. The extra one-to-four weeks' growing period results in a substantial increase in cotton obtained per acre planted. Furthermore, unlike prior art defoliants, unopened bolls are not prevented from opening by ammonia defoliation, and essentially completely defoliation is obtained with anhydrous ammonia vapor in only one application. Contrary to prior art defoliants, ammonia, due to its uniform method of application in vapor state, is most effective on the lower leaves where complete defoliation is essential to avoid boll rot.

Not only is acreage which has been defoliated with ammonia free from any deleterious residue, but any residue left from the ammonia defoliation is actually beneficial to subsequent crops.

It has also been found, as an additional advantage of this invention, that the grade of cotton ginned from cotton plants which have been defoliated with ammonia is higher than that of cotton which had been defoliated with defoliants used in the prior art. These benefits are of substantial advantage to the farmer, since he not only gets a larger harvest per acre by virtue of longer irrigation but he also gets, on the average, a higher grade of cotton.

In detail, the cotton defoliation method of this invention is as follows. Anhydrous ammonia vapor is contacted with growing cotton plants in such a fashion that from about 100–500 pounds of ammonia, preferably 250–350 pounds, are employed per acre of standard cotton crop. The actual amount employed will depend on the density of the cotton crop, the size and type of the cotton, the climate, and the efficiency of the equipment used for applying the ammonia vapor. Generally ammonia is heated and subsequently vaporized by the reduction in pressure which occurs when the anhydrous ammonia liquid is released from pressure storage tanks into the atmosphere. The vapors admix with the air surrounding the cotton plants to make up an ammonia-air mixture containing from about 0.01 to 0.10, preferably 0.02 to 0.06, pound anhydrous ammonia vapor per cubic yard of air. This mixture should be allowed to contact the cotton leaves for a period of time of at least about 0.5 second. The total contact time will vary according to the method used for contact and the amount of ammonia employed. If amounts of ammonia used are chosen from the higher side of the range and extremely efficient equipment for its application is utilized, a minimum contact time is required. Should the amount of ammonia be on the lower end of the range, a longer contact time, 10 or even 15 seconds, may be required particularly if the method of contacting is less efficient. A preferable residence time of from about 2 to 5 seconds has been found, in most instances, to provide adequate defoliation.

The rate of application of ammonia is somewhat affected by the air temperature at the time of application; it has been found that more efficient contacting is accomplished at higher outdoor temperatures. Hooding means is advantageously employed to prevent any larger quantities of ammonia vapor being lost into the atmosphere during application. In practice, the liquid anhydrous ammonia, stored under pressure, is released and allowed to vaporize under a movable hood, preferably at the forward portion of this hood. The hood should move or be pulled through the crop at a sufficient speed to provide the desired average residence time of contact of the vapor mixture around the plant. It is essential, in the process, that all liquid ammonia is vaporized prior to contacting. Liquid ammonia would likely be harmful to the cotton plant, and, furthermore, the amount of ammonia would be considerably increased if liquid ammonia were used rather than vapor, with little or no benefit accruing therefrom.

The invention and the advantages of defoliating according to it are more clearly shown in the following examples. However, these examples are shown only for the purpose of illustration, and the particular apparatus, conditions and/or concentrations employed in these examples are not to be construed as further limitations upon the scope of the invention as hereinbefore described.

*Example 1*

Anhydrous ammonia was applied to one portion of a crop of cotton as described in this invention at the rate of 280 pounds per acre. The liquid anhydrous ammonia was passed through a nozzle, immediately vaporizing upon being released from a pressure storage tank and allowed to come in contact with the atmosphere. The nozzle was located at the forward portion of a 12-foot-long hood which was pulled through the cotton crop at the rate of about three miles per hour. At this rate, any given portion of cotton was underneath the hood and in contact with the ammonia vapor for an average residence time of about 2.7 seconds. The average amount of vapor in contact with the cotton was about 0.05 pound per cubic yard of air surrounding the cotton while it was underneath the hood.

To compare the above means of cotton defoliation with conventional means, three gallons per acre of an 18.7 percent aqueous magnesium chlorate solution further diluted with about 30–50 gallons of water were sprayed, according to methods well known in the art, upon another portion of the same cotton crop as was defoliated as described in this example with anhydrous ammonia vapor. After 7 days, an additional application of the same amount of conventional magnesium chlorate defoliant was made to the portion previously treated with that defoliant.

One month later the cotton on both portions was picked. In the cotton defoliated with the conventional defoliant, about one-fourth bale per acre remained unopened and was lost. In the cotton defoliated with ammonia, only one-tenth bale remained unopened, representing a loss from unopened cotton bolls of only 40 percent of that incurred using a conventional magnesium chlorate defoliant. This comparison shows that ammonia does not have nearly as great an inhibiting effect on subsequent boll opening as does this conventional cotton defoliant.

*Example 2*

Two portions of a cotton crop were defoliated, one with anhydrous ammonia according to the invention and the other with a conventional magnesium chlorate defoliant. The portion defoliated with ammonia graded at middling while that defoliated with the conventional defoliant graded at low middling, representing a 3 to 8 percent increase in income for the crop which was defoliated according to this invention.

As will be evident to those skilled in the art, various modifications on this process may be employed, such as variations in method of applying the ammonia, equipment used, residence time of application, amount of ammonia used, and so forth, as dictated by the particular situation and/or type of cotton; all of these variations, however, are within the spirit and scope of the disclosure and within the scope of the following claims.

We claim:

1. A method of defoliating cotton plants which comprises admixing with the air surrounding said cotton plants a sufficient amount of anhydrous ammonia vapor to surround said cotton plants with an ammonia vapor-air mixture containing from about 0.01 to 0.10 pound of anhydrous ammonia per cubic yard of air for a period of at least about 0.5 second.

2. A method of defoliating cotton plants which comprises admixing with the air surrounding said cotton plants a sufficient amount of anhydrous ammonia vapor to surround said cotton plants with an ammonia vapor-air mixture containing from about 0.02 to 0.06 pound of anhydrous ammonia per cubic yard of air for a period of about 2.0 to 5.0 seconds.

References Cited in the file of this patent

Strogonov in "Chemical Abstracts," vol. 41, 1947, col. 4543g.

Wehner in "Chemical Abstracts," vol. 23, 1929, page 2201.